No. 650,107. Patented May 22, 1900.
H. W. FORSLUND.
PNEUMATIC DESPATCH SYSTEM.
(Application filed Sept. 18, 1899.)
(No Model.) 4 Sheets—Sheet 1.
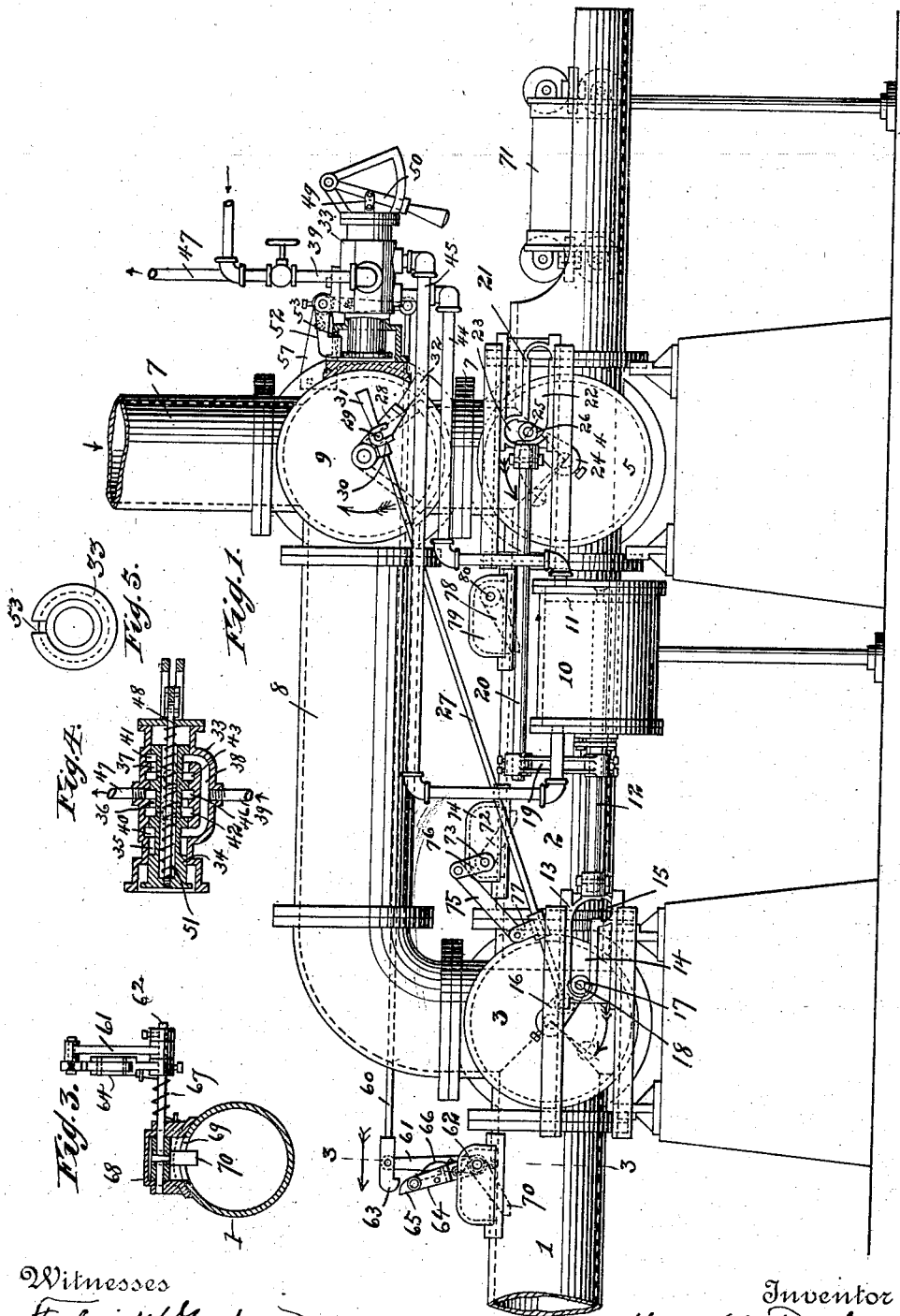
Witnesses
Frederick F. Goodrum
A. H. Barnes.
Inventor
Hugo W. Forslund,
By his Attorneys
Offield, Towle & Linthicum.

No. 650,107. Patented May 22, 1900.
H. W. FORSLUND.
PNEUMATIC DESPATCH SYSTEM.
(Application filed Sept. 18, 1899.)
(No Model.) 4 Sheets—Sheet 2.
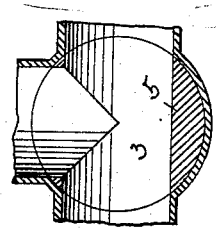
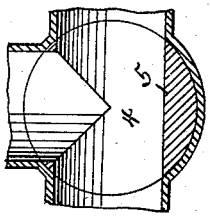
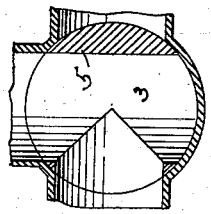
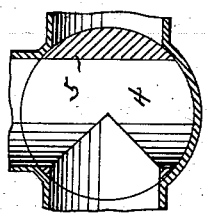
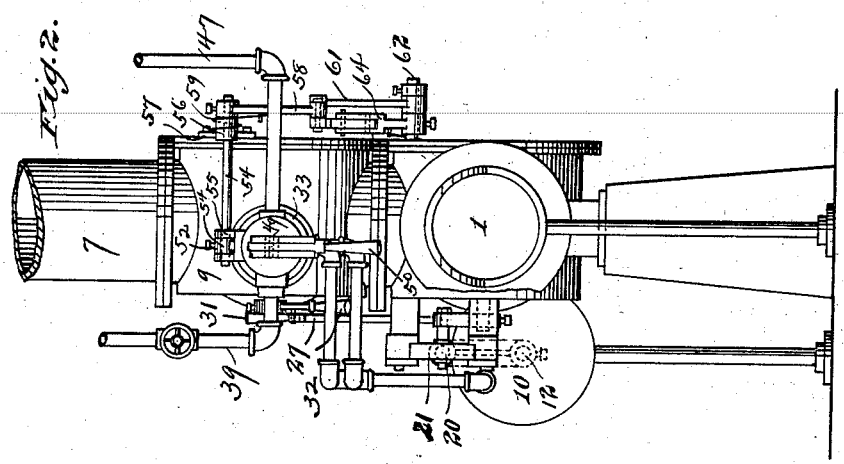
Witnesses
Frederick Goodwin
A. H. Barnes.
Inventor
Hugo W. Forslund,
By his Attorneys
Offield, Towle & Linthicum.

No. 650,107. Patented May 22, 1900.
H. W. FORSLUND.
PNEUMATIC DESPATCH SYSTEM.
(Application filed Sept. 18, 1899.)
(No Model.) 4 Sheets—Sheet 3.
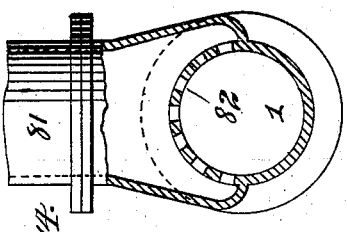
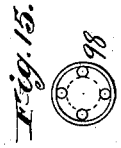
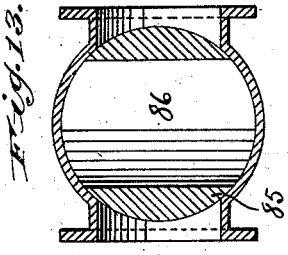
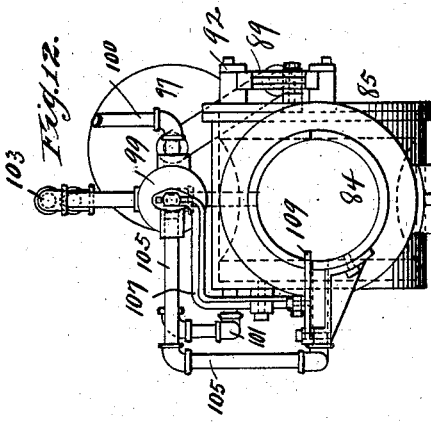
Witnesses
Frederick F. Goodwin
A. H. Barnes
Inventor
Hugo W. Forslund,
By his Attorneys
Offield, Towle & Linthicum,

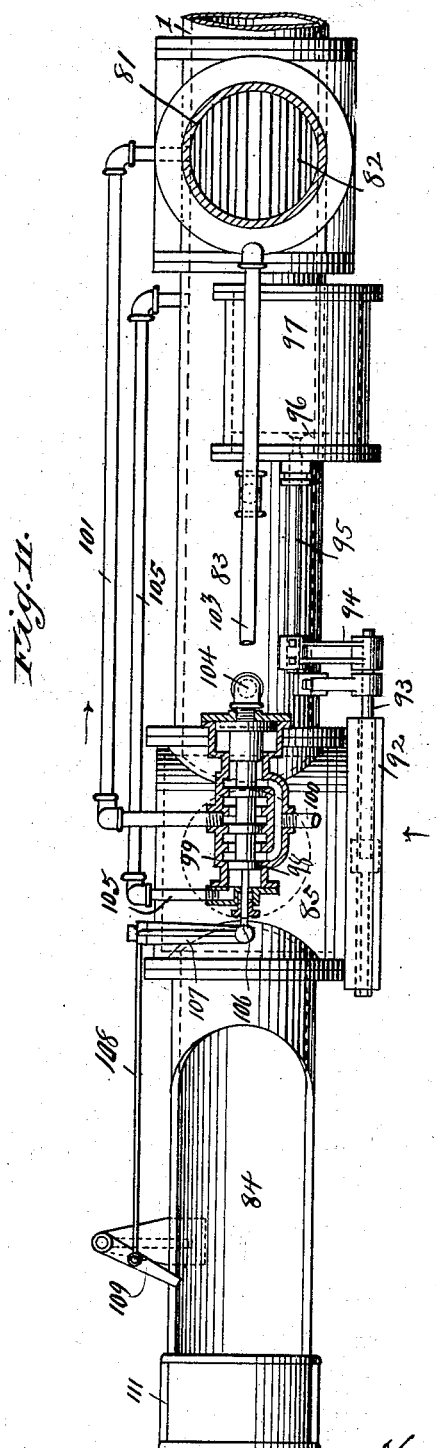

UNITED STATES PATENT OFFICE.

HUGO W. FORSLUND, OF CHICAGO, ILLINOIS, ASSIGNOR TO THE LAKE STREET MANUFACTURING COMPANY, OF SAME PLACE.

PNEUMATIC-DESPATCH SYSTEM.

SPECIFICATION forming part of Letters Patent No. 650,107, dated May 22, 1900.

Application filed September 18, 1899. Serial No. 730,839. (No model.)

*To all whom it may concern:*

Be it known that I, HUGO W. FORSLUND, of Chicago, Illinois, have invented certain new and useful Improvements in Pneumatic-Despatch Systems, of which the following is a specification.

This invention relates to pneumatic-despatch systems, and has for its object to provide means whereby the carriers may be introduced into and discharged from the system with a minimum amount of loss of air-pressure, this result being effected by means of suitable valves or gates and automatic mechanism whereby their operation is effectively controlled.

The present invention consists in certain novel features, which I will now proceed to describe and will then particularly point out in the claims.

In the accompanying drawings, Figure 1 is a side elevation, partly in section, of a sending-terminal embodying my invention. Fig. 2 is an end elevation of the same. Fig. 3 is a detail sectional view taken on the line 3 3 of Fig. 1 and looking in the direction of the arrow. Fig. 4 is a plan section through the motor-controlling valve and its casing. Fig. 5 is an end view of said valve-casing. Fig. 6 is a sectional view illustrating the normal position of the inner valve. Fig. 7 is a view illustrating the position of this valve during the introduction of a carrier into the system. Fig. 8 is a similar view showing the normal position of the outer valve. Fig. 9 is a similar view showing the position of this valve during the introduction of a carrier into the system. Fig. 10 is a side elevation, partly in section, of the receiving-terminal. Fig. 11 is a plan view of the same, partly in section.
Fig. 12 is an end elevation of the same. Fig. 13 is a vertical sectional view through the receiving-terminal valve, showing the same in its normal position. Fig. 14 is a detail view, partly in section and partly in elevation, of the connection between the main tube and its branch pipe; and Fig. 15 is a detail elevation of one end of the motor-controlling valve.

Referring first to the sending-terminal, which is shown in Figs. 1 to 9 of the drawings, 1 indicates the main tube, and 2 the terminal portion of said tube, into which the carrier is inserted for the purpose of despatching it through the system. In this terminal portion are located at separated points two valves 3 and 4, preferably constructed in the manner shown in detail in Figs. 6 to 9 of the drawings, said valves being rotary valves of the three-way type, each provided with a segment or portion 5, adapted to close that one of the passages against the mouth of which it may be moved.

7 indicates the air-supply pipe, which extends to the fan or blower or to the return side of the system, this air-supply pipe opening into the terminal-section of the main pipe at the point where the outer valve 4 is located.

8 indicates a branch pipe extending from the air-supply pipe 7 to the main line at the point where the inner valve 3 is located. At the junction of the pipes 7 and 8 is located a rotary three-way valve 9, similar in construction to the valves 3 and 4 and adapted to direct the air-supply either into the branch pipe 8, as in the position shown in dotted lines in Fig. 1 of the drawings, or to be so turned as to close said branch pipe and cause the air to pass directly through the supply-pipe into the main line or its terminal-section at the point where the valve 4 is located.

In order to operate the valves 3, 4, and 9, I employ a motor comprising a cylinder 10, containing a piston 11, the piston-rod 12 whereof is provided with a cam-plate 13, having a slot therein comprising a horizontal portion 14 and a vertical portion 15 at right angles thereto. The valve 3 is provided on its axis with a crank-arm 16, having a pin 17, which extends into the slot of the cam-plate 13 and which is provided with an antifriction-roller 18. The piston-rod 12 has adjustably secured to it an arm 19, to which in turn is adjustably secured a rod 20, which extends parallel with the piston-rod 12, but in the opposite direction from the cylinder 10. This rod 20 is provided with a cam-plate 21, wherein is formed a cam-slot having a horizontal portion 22 and a vertical portion 23 at right angles thereto. The valve 4 is provided with a crank-arm 24, having a pin 25, which engages the cam-slot of the plate 21 and is provided with an antifriction-roller 26. The valve 9 is operated under normal conditions in unison with the valve 3, its movement being effected by means of a connecting-rod 27, one end of which is connected with the crank-arm 16 of the valve 3, while the other end is connected with a crank-arm 28 on the axis of the valve 9. The connection at this point is a detachable one, the arm 28 being provided with a pin 29 and the rod 27 being provided with a U-shaped plate 30, which fits over said pin, but may be readily disengaged therefrom, and to facilitate this disengagement, which requires a lifting upward of the adjacent end of the rod 27, said end of said rod is provided with a handle 31. In order to facilitate the operation by hand of the valve 9 when the rod is thus disconnected, the arm 28 terminates in a handle 32.

The operation of the motor is controlled by means of a valve comprising a casing 33 and a valve proper, 34, located therein. This valve is a balanced valve having a cylindrical body, around which are formed three grooves or passages 35, 36, and 37. The casing is provided with a passage 38, which communicates with an air-supply pipe 39, which leads to a suitable source of supply of air under pressure. The two ends of the passage 38 communicate with annular grooves 40 and 41 near the ends of the casing. Within the grooves 40 and 41 lie two similar annular grooves 42 and 43, the former of which is connected, by means of a pipe 44, with one end of the cylinder 10, while the latter communicates, by means of a pipe 45, with the other end of said cylinder. There is also provided in the casing a central annular groove 46, which communicates with an exhaust-pipe 47. It will be observed that when the valve is in the position shown in Figs. 1 and 4 of the drawings air under pressure entering through the pipe 39 passes through the passage 38 to the annular groove 41, which communicates, by means of the groove 37 of the valve, with the groove 38 of the casing and with the pipe 45. The air under pressure is thus admitted through the pipe 45 to the left-hand side of the cylinder 10 and maintains the piston 11 thereof in the position shown in dotted lines in Fig. 1 of the drawings, which is the normal position of the parts. At the same time the right-hand end of the cylinder is in communication through the pipe 44 with the annular grooves or passages 42, 36, and 46, and consequently with the exhaust-pipe 47. When the valve 34 is shifted to the right from the position shown in Fig. 4 of the drawings, the pipe 44 is placed in connection with the exhaust-pipe 47 in a manner which will be readily understood, and the piston 11 will then move to the opposite end of the cylinder from that in which it is shown.

In order to operate the controlling-valve 34, said valve is provided with a stem 48, which is connected, by means of links 49, with a hand-lever 50. The valve 34 is normally held in the position shown by means of a spring 51, which spring tends to move the valve toward the said position when the valve is free to move. I also provide means for holding the valve for a suitable period of time in the position to which it is moved from the normal when the lever 50 is operated, and to this end I employ a pawl or dog 52, which is adapted to drop by gravity in front of the end of the valve when this latter is drawn out. The end of the valve-casing is provided with a slot 53, through which the pawl 52 extends and by which it is guided. The pawl 52 is mounted on a rock-shaft 54, carried in bearings 55, mounted on the top of the valve-casing 33, and in a bearing 56, carried by a bracket 57. This rock-shaft 54 is provided with a downwardly-extending arm 58, and a spring 59 is provided, which acts upon the arm 58 and the rock-shaft 54 in such a manner as to move the pawl or dog 52 downward to cause it to tend to engage with and hold the valve 34. The arm 58 has connected to it a rod 60, which extends rearward to a point adjacent to the main line of tubing beyond or inward from the valve 3, where its end is supported by means of a vibrating arm 61, loosely mounted on a shaft 62. The end of the rod 60 terminates in a hook 63, and there is secured on the shaft 62 an arm 64, terminating in a pivoted toe 65, adapted to yield in one direction only and held normally in position by a spring 66. The shaft 62 is a rock-shaft and is provided with a spring 67, which tends to hold it in the position shown and to return it to said position after displacement, said spring 67 being a stronger spring than the spring 59 hereinbefore mentioned. The rock-shaft 62 extends into a suitable casing or housing 68, mounted on the main tube 1 and communicating therewith by a slot or opening 69, and at this point the rock-shaft 62 is provided with a finger or projection 70, which normally extends down through the slot or opening 69 into the interior of the main tube 1 in a position where it is adapted to be engaged by the carrier in its passage.

The general operation of the terminal as thus constructed is as follows: The carrier, which is indicated at 71, is introduced through the valve 4 when the parts are in the position shown, occupying a position between the valves 3 and 4. The hand-lever 50 is then drawn outward, thereby shifting the controlling-valve 34 in such a manner as to bring the air-pressure upon the right-hand side of the piston 11. The piston is thus caused to move to the other end of the cylinder, but has imparted at the same time motion in the same direction to the rods 12 and 20 and to their cam-plates 13 and 21. During the initial portion of this movement the valve 3 is stationary, the pin 17 traveling in the straight portion 14 of the cam-slot, and since the valve 9 is moved from the valve 3 said valve 9 is also stationary during this period. The valve 4, on the contrary, begins to move as soon as the piston 11 begins to move by reason of the fact that its pin 25 is in engagement with the vertical sides of the vertical portion 23 of the cam-slot in the plate 21. This movement of the valve 4 continues throughout an arc of about ninety degrees or until the communication with the outer air through the end of the terminal is closed by means of the part 5 of the valve. By this time the pin 25 has reached the position shown in dotted lines, in which position it is in line with the horizontal portion 22 of the cam-slot, so that during the further movement of the parts in the direction under consideration the valve 4 will remain stationary. At this point, however, the pin 17 has come into contact with the wall of the vertical portion 15 of the cam-slot in the plate 13, and during the continued movement of said plate the valve 3 is rotated through an arc of about ninety degrees, so as to open communication between the terminal-section 2 and the main tube 1. During this movement of the valve 3 the valve 9 has been correspondingly moved through a similar arc, so as to close the branch pipe 8 and open direct communication through the supply-pipe 7. As soon as this occurs the air under pressure passes down into the terminal-section behind the carrier therein and propels the carrier through the valve 3 and into and along the main tube 1. When the controlling-valve 34 is first shifted by means of the hand-lever 50, the dog or pawl 52 drops behind the rear end of the valve and holds it in the position to which it has been moved. When, however, the carrier passes under the finger 70, it vibrates the rock-shaft 62 and causes the arm 64 to move under the hooked end 63 of the rod 60. The yielding toe 65 permits this operation, and the spring 66 returns said toe to its proper position after it has passed the hook 63. As soon as the carrier has passed the finger or projection 70 the spring 67 operates to cause the toe 65 to engage the hook 63, and said spring will pull upon the rod 60 with a force sufficient to overcome the spring 59 and lift the dog 52 clear of the end of the valve 34. The spring 51 thereupon moves the valve 34 back to the position shown in Fig. 4, whereupon air under pressure is admitted to the left-hand side of the cylinder 10 and the piston moves back toward its original position. During the initial portion of this movement the valves 3 and 9 return to the position shown in Fig. 1, while the valve 4 is stationary, owing to the travel of the pin 25 in the horizontal portion 22 of the cam-slot in the plate 21. When the pin 17 begins to travel along the horizontal portion 14 of the cam-slot in the plate 13, the valves 3 and 9 remain stationary, and during this period the pin 25 is engaged by the vertical portion 23 of the cam-slot in the plate 21 and the valve 4 is so moved as to open communication between the terminal-section 2 and the outer air. The parts are thus returned to their normal position, and the terminal is ready for the introduction of another carrier. It will be observed that after the introduction of the carrier communication with the outer air is first cut off, and the air under pressure, which furnishes the motive power of the system, is then diverted to a point behind the carrier, so as to propel the same through the system. As soon as the carrier is well within the main tube the parts are returned to their normal position in such an order as to prevent any communication between the internal pressure and the outer air, thus preventing waste.

In case of any blockade or stoppage of the carrier within the main tube the air-pressure may be readily cut off from the main tube and diverted to the exterior of the system by disconnecting the rod 27 from the crank-arm 28, whereupon the valve 9 may be so turned by means of its handle 32 as to close the branch pipe 8 and cause the air-current to pass outward through the valve 4 to the atmosphere.

In order to prevent the carrier from coming into contact with the valve 3 when this latter is in the position shown in the drawings, I provide in front of said valve a pawl or stop-finger 72, which is mounted on a rock-shaft 73 and inclosed in a suitable housing 74, said pawl extending through a slot in the terminal-section 2, so as to lie in the path of the carrier and arrest its forward motion when said carrier is introduced and the stop-finger is in its normal position. This finger is operated by means of a link 75, connected to an arm 76 on the rock-shaft 73 and to an arm 77 on the rod 27. It will thus be seen that when the valve 3 is in position to close the terminal-section 2 and is thus liable to be struck by the carrier when this latter is introduced the stop-finger 72 will prevent the carrier from striking the valve, while as soon as the valve is moved into a position to permit the carrier to pass, the stop-finger 72 will be withdrawn from the path of the carrier, and this latter will be free to enter the system. I also provide at a point immediately inward from the valve 4 a second stop-finger 78, mounted in a housing 79 on an axis 80 and extending through a slot into the terminal-section 2 in a direction opposite to that in which the stop-finger 72 projects. This stop-finger 78 is free to rise to permit the carrier to pass under, but will prevent any retrograde motion of the carrier after it has been introduced. This is advantageous for the reason that in case of the obstruction of the system the air-current is sometimes diverted or turned back in such a way as to tend to blow the carrier back out of the system when the position of the valves is changed.

In Figs. 10 to 15 of the drawings I have shown a receiving-terminal comprising the main-line tube 1, having a branch tube 81, into which the air passes through the usual slotted partition 82. (Shown in detail in Fig. 14.) 83 indicates the terminal-section proper, and 84 the receiving-chute, into which the carrier is discharged. Between these two parts and at the end of the receiving-terminal section 83 is located a valve 85, which is normally closed, as shown in Figs. 10, 11, and 13. This valve is a cylindrical valve, having a passage 86 therethrough. This valve is provided with a crank-pin 87, carrying an antifriction-roller 88 and adapted to travel in the cam-slot of a cam-plate 89, said slot having a horizontal portion 90 and a vertical portion 91. The cam-plate 89 slides in suitable ways 92 and is connected, by means of a rod 93, with an arm 94, which is in turn secured to the piston-rod 95 of a piston 96, located within a motor-cylinder 97. The connection of the arm 94 with the rods 93 and 95 is preferably an adjustable one in order to regulate the limits of movement of the valve 85. The motor-cylinder 97 is controlled by means of a valve 98, located within a valve-casing 99, said valve being a balanced valve. This construction is substantially identical to that of the valve 34 hereinbefore described. The air-inlet pipe, by means of which air under pressure is supplied from any suitable source, is indicated at 100, while the exhaust-pipe, which may lead to the branch pipe 81 or to any other suitable point of discharge, is indicated at 101. A pipe 102 leads from the controlling-valve to one end of the cylinder 97, while a pipe 103 leads from said valve to the other end of said cylinder. The controlling-valve is operated in the following manner: A pipe 104 communicates with the terminal-section 83 at a point immediately inward from the valve 85 and extends thence through one end of the valve-casing 99, so as to cause the air-pressure to act against that end of said valve. A pipe 105 extends from the other end of said valve-casing to a point some distance inward from the valve 85, where it also communicates with the interior of the terminal-section 83. Under normal conditions the pressure on the opposite ends of the valve 98 is balanced and said valve remains in the position shown in Figs. 10 and 11 of the drawings. When the parts are in this position, the piston 96 is at the left-hand end of the cylinder 97 and the valve 85 is closed. Upon the advent of a carrier at the receiving-terminal the air is compressed between the front end of said carrier and the closed valve 85, and the pressure thus created is transmitted through the pipe 104 to the interior of the valve-casing 99 and acting against the end of the valve 98 therein tends to move it toward the other end of the casing. At the same time, as soon as the carrier has passed the point where the pipe 105 opens into the terminal-section, a partial vacuum is formed in said pipe, and this minus pressure acts upon the other end of the valve 98 and assists in shifting it from one end of its casing to the other. As soon as the valve 98 is shifted air under pressure is admitted through the pipe 102 into the cylinder 97 at the left-hand end thereof and the piston therein is moved toward the right. This movement is communicated through the connecting mechanism already described to the cam-plate 89. During the initial portion of this movement the pin 87 travels in the horizontal part 90 of the cam-slot and the valve 85 is not moved; but during the latter part of this movement the pin 87 comes in contact with the wall of the vertical portion 91 of the cam-slot and the valve 85 is moved into a position such that the aperture or passage 86 therethrough is in line with the terminal-section 83 and receiving-chute 84. This delayed action of the valve provides a sufficient cushion for the carrier as it approaches said valve, and thus prevents the carrier from striking the valve and doing damage. As soon as the valve is open the carrier passes out into the chute 84.

In order to return the valve 98 to its normal position, I provide said valve with a stem 106, to which is connected the upper end of a lever 107. The lower end of this lever is connected, by means of a rod 108, with a pivoted arm 109, which extends into the receiving-chute 84. The normal position of this arm 109 is that shown in full lines in Fig. 11; but when the valve 98 is moved by the incoming carrier in the manner already described this arm is moved into the position shown in dotted lines in Fig. 11, in which position it remains until it is struck by the carrier as it issues from the terminal-section. This movement of the arm 109 serves by the connecting mechanism just described to return the valve 98 to the position shown, which is its normal position, whereupon the motor-cylinder 97 operates through its piston 96 to again close the valve 85.

I provide at the end of the receiving-chute 84 a buffer-plate 110, which fits loosely within a cylinder 111 and is provided with a stem 112, adapted to slide through a sleeve 113. A spring 114 serves to thrust this buffer-plate normally outward, while the said spring, together with the air-cushion formed within the cylinder, serves to provide a yielding resistance to the carrier when it strikes the buffer-plate.

It is obvious that the details of construction hereinbefore specifically described, and shown in the accompanying drawings, may be modified without departing from the principle of my invention and that some of the features referred to may be omitted without affecting the operativeness of the remainder. I therefore do not wish to be understood as limiting myself strictly to the precise details of construction hereinbefore set forth, and shown in the drawings.

I claim—

1. In a pneumatic-despatch system, a sending-terminal comprising a main tube having two separated three-way valves therein, an air-supply tube communicating directly with the main tube through the outer valve and having a branch pipe communicating with the main tube through the inner valve, and a three-way valve controlling the supply of air through the air-supply tube and its branch, whereby the air may be delivered into the main tube through the outer valve thereof when said outer valve is closed to the outer air, and whereby the air may be delivered into the main tube through the inner valve thereof when the outer valve is open, substantially as described.

2. In a pneumatic-despatch system, a sending-terminal comprising a main tube having two separated three-way valves therein, an air-supply tube communicating directly with the main tube through the outer valve and having a branch pipe communicating with the main tube through the inner valve, a three-way valve controlling the supply of air through the air-supply tube and its branch, and automatic means for operating said valves, the outer main-tube valve operating alone and the inner main-tube valve and air-supply-pipe valve operating in unison with each other, substantially as described.

3. In a pneumatic-despatch system, a sending-terminal comprising a main tube having two separated three-way valves therein, an air-supply tube communicating directly with the main tube through the outer valve and having a branch pipe communicating with the main tube through the inner valve, a three-way valve controlling the supply of air through the air-supply tube and its branch, a motor connected with said valves, a controlling-valve for said motor, means for manually operating said controlling-valve in one direction and automatic mechanism actuated by the carrier for operating said controlling-valve in the opposite direction, substantially as described.

4. In a pneumatic-despatch system, a sending-terminal comprising a main tube having separated valves therein, an air-supply tube communicating directly with the main tube at or near its inlet end and having a branch pipe communicating with the main tube at a point inward therefrom, and a three-way valve located at the junction of the air-supply tube and its branch pipe, said valve being normally connected and operating in unison with the inner main-tube valve, said connection being readily detachable to permit independent operation of the air-supply-tube valve, substantially as described.

5. In a pneumatic-despatch system, the combination, with a tube having rotary valves therein provided with eccentric pins, of a motor, and reciprocating cam-plates actuated by said motor and provided with slots with which said pins engage, said slots being partly in the line of reciprocation and partly at an angle thereto, whereby said valves are successively operated and held stationary when not in operation, substantially as described.

6. In a pneumatic-despatch system, a receiving-terminal comprising a main tube having a valve or gate therein, a motor to actuate said valve or gate, a valve controlling said motor, and pipes or passages extending from said valve to the main tube at separated points, one immediately inward from the gate or valve and the other some distance farther inward therefrom, whereby both the increased pressure of the air between the front of the carrier and the gate or valve and the diminished pressure in the rear of the carrier serve to operate the controlling-valve, substantially as described.

7. In a pneumatic-despatch system, a receiving-terminal comprising a main tube having a valve or gate therein, a motor to actuate said valve or gate, a reciprocating balanced valve controlling said motor, a pipe or passage leading from one end of said controlling-valve to the main tube immediately inward from the valve or gate therein, and a second pipe or passage leading from the opposite end of said controlling-valve to a point farther inward of the main tube, whereby both the increased pressure ahead of the carrier and the diminished pressure behind it are utilized to operate said controlling-valve, substantially as described.

8. In a pneumatic-despatch system, a receiving-terminal comprising a main tube, a rotary valve therein having a passage for the carrier through its body and provided with an eccentric pin, a motor, and a reciprocating cam-plate having a slot with which the eccentric pin engages, said slot being partly in the line of reciprocation and partly at an angle thereto, whereby a delayed action of said valve is obtained, substantially as described.

HUGO W. FORSLUND.

Witnesses:
IRVINE MILLER,
ADA H. BARNES.